United States Patent
Niedecker

[11] Patent Number: 5,772,499
[45] Date of Patent: Jun. 30, 1998

[54] ARRANGEMENT OF SAUSAGE SUSPENSION LOOPS

[75] Inventor: Frank Niedecker, Bad Soden, Germany

[73] Assignee: Poly-Clip System GmbH & Co. KG, Frankfurt, Germany

[21] Appl. No.: 638,007

[22] Filed: Apr. 25, 1996

[30] Foreign Application Priority Data

Apr. 28, 1995 [DE] Germany .................. 195 15 605.6

[51] Int. Cl.[6] .................................................. A22C 15/00
[52] U.S. Cl. ................................... 452/185; 452/186
[58] Field of Search .......................... 452/185, 186, 452/187, 51

[56] References Cited

U.S. PATENT DOCUMENTS 3,951,262 4/1976 Niedecker ................ 452/185

FOREIGN PATENT DOCUMENTS 2913495 10/1979 Germany .................. 452/186

Primary Examiner—Willis Little
Attorney, Agent, or Firm—Sprung Kramer Schaefer & Briscoe

[57] ABSTRACT

This invention relates to an arrangement of a plurality of individual, closed sausage suspension loops, which are held beside each other by a belt, so that from each side of the belt a partial loop protrudes, where the first partial loop is designed for being inserted in a closing member for the end of the sausage, and in the second partial loop a smoking skewer or the like can be introduced, and which is characterized in that the sausage suspension loops (14) of uniform and flat shape consist of an elastic plastic material in the form of a strand and are dimensionally stable, and that the first partial loop (22) comprises two mutually parallel portions (24, 26) of the plastic strand, which are connected with each other by a vertically extending transverse portion (28) of the plastic strand.

5 Claims, 1 Drawing Sheet

ARRANGEMENT OF SAUSAGE SUSPENSION LOOPS

This invention relates to an arrangement of a plurality of individual, closed sausage suspension loops, which are held beside each other by a belt, so that from each side of the belt a partial loop protrudes, where the first partial loop is designed for being inserted in a closing member for the end of the sausage, and in the second partial loop a smoking skewer or the like can be introduced.

Sausages are usually provided with loops on which they can be suspended for further processing (e.g. for smoking) or for storage. One method of fixing such sausage suspension loops at the sausage consists in inserting one end of the sausage suspension loop together with the end of the sausage casing in a closing clip, which is subsequently closed. The individual sausage suspension loops are mechanically supplied to the closing clip by means of the belt.

Such an arrangement of sausage suspension loops is described in the German Patent Specification 2 352 000. The individual sausage suspension loops are fixed with a distance one beside the other on a belt, so that from both sides of the belt open partial loops protrude, where the one partial loop is designed for being inserted in a closing member for the end of the sausage, whereas the other partial loop must for instance be threaded onto a smoking skewer. Practice has shown that the known arrangement of sausage suspension loops repeatedly leads to problems during the mechanical insertion of the sausage suspension loops in the closing clip. In addition, a further automation of the production of sausages is desired, where not only the partial production steps, as for instance the insertion of the individual sausage suspension loops in the closing clips is performed by means of a machine, but after this step the sausages should still be handled by automatic machines. It should in particular be possible to automatically thread the sausages onto a smoking skewer after having provided each of them with a loop.

The object underlying the invention is to provide an arrangement of sausage suspension loops, which provides for an unproblematic insertion of the sausage suspension loops in closing clips, and in addition allows the automatic handling of the loops in further production steps.

This object is solved by an arrangement of sausage suspension loops of the above-stated kind, which is characterized in that the sausage suspension loops of uniform and flat shape consist of an elastic plastic material in the form of a strand and are dimensionally stable, and that the first partial loop comprises two mutually parallel portions of the plastic strand, which are connected with each other by a vertically extending transverse portion of the plastic strand.

First of all, the invention has all the advantages already known from the DE-AS 2 352 000, namely that the loops can be wound onto a coil body, from where they can be mechanically supplied to an insertion point. In addition, the invention also provides for a further automatic handling of the sausages, because due to their dimensional stability the sausage suspension loops can be optically scanned by handling devices. Furthermore, the dimensional stability both prevents insertion errors and the twisting of the loops, as it has frequently occurred in the prior art and has impeded the threading of the conventional yarn loops.

From the German Utility Model 68 09 226 suspension loops are known, which consist of a plastic material. The same can, however, not be hung into a closing clip before the same is closed, but must rather be manually placed onto the sausage before the sausage casing is gathered to form a tip, so that said suspension loops undergo the preceding displacement of the sausage stuffing and the spreading of the sausage casing in an undefined position, before a closing clip is attached and closed. In an automatic dual-clip method, for instance, there is therefore constantly the risk that during the attachment of the clips the long stem of the suspension loops is seized by both clips, and accordingly is in the way or is also cut through, when the sausage casing of two succeeding sausages is cut through between the two clips. Said suspension loops are therefore not suited especially for automatic dual-clip methods.

On the other hand, the special shape of the inventive suspension loops—and their dimensional stability—provide for the desired automatic processing, by allowing the suspension loops with their mutually parallel portions to be fixed on a belt such that the same is not distorted. In addition, due to the length of the transverse portion the same can tolerate certain positioning errors with respect to its longitudinal direction, which generally corresponds to the conveying direction of the suspension loops, when it is inserted or hung into a closing clip. Last, but not least, the transverse portion can be positioned very precisely transverse to the conveying direction of the suspension loops, due to the inventive shape of the loops.

The sausage suspension loops are preferably shaped such that the second partial loop has the shape of a "U" with converging legs, which do, however, not contact each other, and the mutually parallel portions of the plastic strand each join a leg of the "U" at their one end. The U-shaped portion of the loops is particularly suited for being threaded onto a smoking skewer or the like.

In a preferred variant of the invention the mutually parallel portions of the sausage suspension loops are fixed at the belt such that one edge of the belt extends in direct vicinity of the transition of the parallel portions to the converging legs of the U-shaped portions of the sausage suspension loops. Such attachment of the loops has the advantage that a belt consisting of two adhesive tapes with adhesive surfaces facing each other is not distorted as a result of the loop portions disposed between the adhesive surfaces; in addition, the belt of the claimed arrangement extends in direct vicinity of the transverse portions of each loop, which are designed for being inserted in the closing means. In this way, errors during the insertion of a sausage suspension loop in a clip as a result of an inaccurate guidance are largely avoided.

In a preferred embodiment of the invention the length of the parallel portions of the first partial loop is about a quarter of the total length of the sausage suspension loops, the maximum width of the sausage suspension loops is about a third of their total length, and the distance of the parallel portions from each other is about an eighth of the total length.

The plastic strand preferably has a substantially uniform cross-section, and its surface is designed as an imitation cord.

In the following, one embodiment of the invention should be explained with reference to the Figures, wherein.

Figure 1:
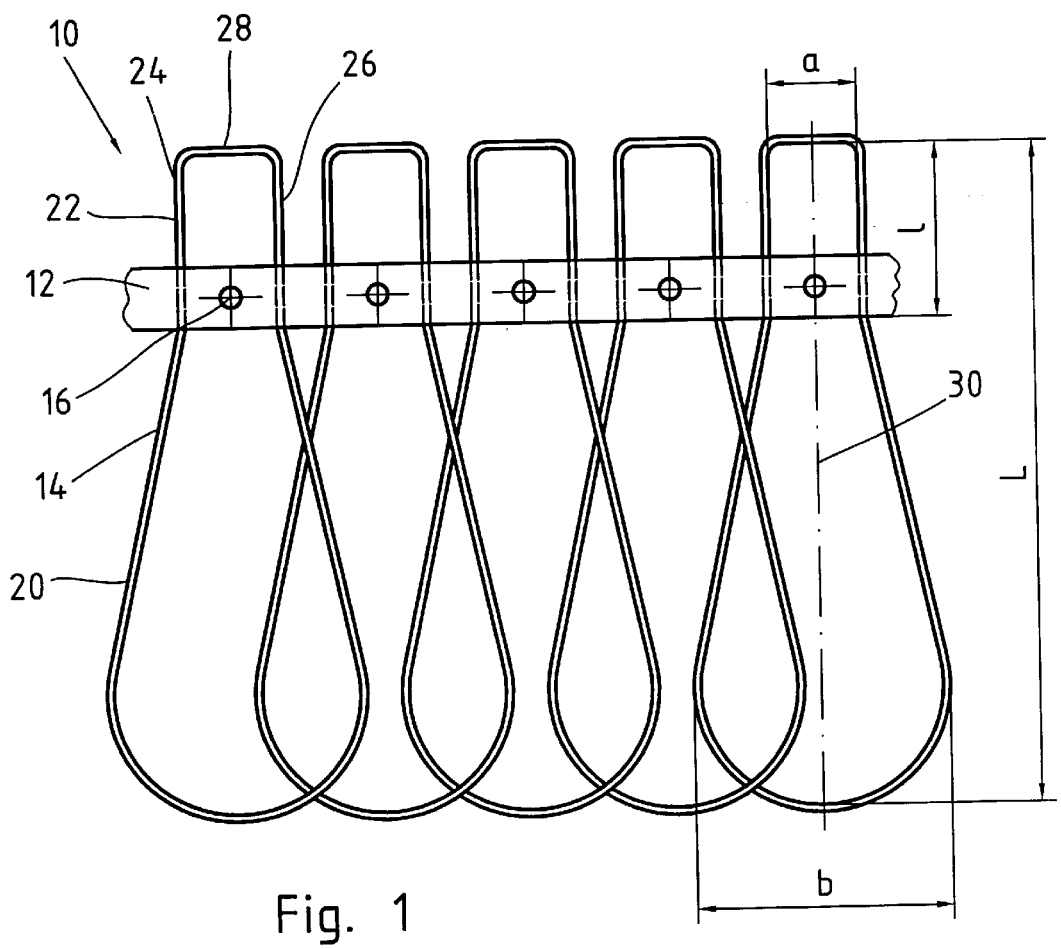
FIG. 1 shows a top view of an inventive arrangement of sausage suspension loops.

The illustrated arrangement 10 of sausage suspension loops comprises a belt 12, on which a number of identical sausage suspension loops 14 is fixed. The belt 12 is for instance formed of two paper or plastic strips holding between them the individual sausage suspension loops. The belt 12 is provided with equally spaced holes 16. The distance between two holes 16 corresponds to the distance between the sausage suspension loops 14. The holes 16 serve the timed transport of the belt with the sausage suspension loops.

The closed sausage suspension loops 14 are formed of an imitation cord made of an extruded elastic plastic material and comprise two partial loops 20 and 22, of which in the drawing the one partial loop 20 is disposed below the belt and has the shape of a "U" with converging legs, whereas in the drawing the second partial loop 22 is disposed above the belt 12 and has two mutually parallel portions 24 and 26 of the imitation cord, whose one end joins the legs of the U-shaped lower portion 20, and whose other ends are connected to a transverse portion 28 of the imitation cord portions. The imitation cord of a sausage suspension loop 14 everywhere has an approximately constant cross-section.

Figure 2:
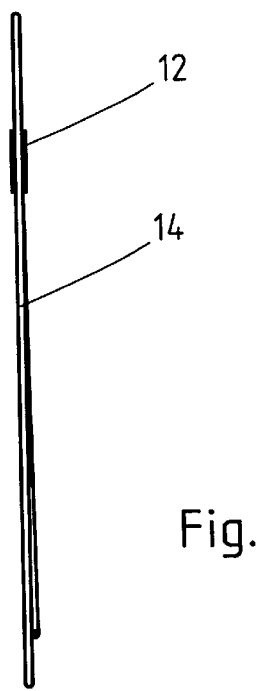
FIG. 2 shows a lateral sectional view of an inventive arrangement of sausage suspension loops.

FIG. 2 shows that the sausage suspension loops 14 are flat in a side view.

The sausage suspension loops 14 are arranged on the belt 12 such that their center lines 30 extend parallel to each other and vertical to the longitudinal direction of the belt 12. The holes 16 in the belt 12 are located on the intersection of the center lines 30 of the sausage suspension loops 14 with the center line of the belt 12. The distance between adjacent sausage suspension loops 14 is chosen such that only the U-shaped partial loops 20 of directly adjacent sausage suspension loops 14 overlap each other in a top view (FIG. 1). The parallel portions 24, 26 of the sausage suspension loops 14 are fixed on the belt 12 such that one edge of the belt 12 extends in direct vicinity of the transition of the parallel portions 24, 26 to the converging legs of the U-shaped portion of each sausage suspension loop 14.

The length l of the parallel portions 24, 26 of the sausage suspension loops 14 is about a quarter of their total length L, the maximum width b is about a third of their total length L, and the distance a of the parallel portions 24, 26 from each other is about an eighth of the total length L of a sausage suspension loop 14. The width of the belt 12 is about a tenth of the total length L of a sausage suspension loop 14.

In the production of sausages, sausage suspension loops 14 are supplied to an automatic closing machine in a timed manner by means of the belt 12. In the automatic closing machine, the transverse portions 28 of the upper partial loops 22 of each sausage suspension loop 14 together with one end of the sausage casing are inserted in a closing clip for closing sausage ends. Subsequently, the closing clip is closed. Insertion and closing errors are largely avoided due to the position of the belt 12 and the approximately rectangular shape of the upper partial loop 22. Even under the influence of the forces exerted by the closing clips on the sausage suspension loops 14, the partial loops 20 of the flexible sausage suspension loops 14 approximately maintain their original shape, so that they can for instance easily be threaded onto a smoking skewer. The transport and the threading of the sausages with the sausage suspension loops 14 can be performed by automatic handling devices operating with an optical scanning system, which is able to optically detect the sausage suspension loops fixed at the sausages, so that the handling device can be controlled by means of the optical scanning system. The invention thus provides for a substantially increased automation of the production of sausages than has so far been the case.

I claim:

1. Arrangement of a plurality of individual, closed sausage suspension loops, which are held beside each other by a belt, so that from each side of the belt a partial loop protrudes, where the first partial loop is designed for being inserted in a closing member for the end of the sausage, and in the second partial loop a smoking skewer or the like can be introduced, characterized in that the sausage suspension loops (14) of uniform and flat shape consist of an elastic plastic material in the form of a strand and are dimensionally stable, and that the first partial loop (22) comprises two mutually parallel portions (24, 26) of the plastic strand, which are connected with each other by a horizontally extending transverse portion (28) of the plastic strand.

2. The arrangement of sausage suspension loops as claimed in claim 1, characterized in that the second partial loop (20) has the shape of a "U" with converging legs which do not contact each other, and the mutually parallel portions (24, 26) of the plastic strand each join a leg of the "U" at their one end.

3. The arrangement of sausage suspension loops as claimed in claim 2, characterized in that the mutually parallel portions (24, 26) of the sausage suspension loops (14) are fixed at the belt (12) such that one edge of the belt (12) extends in direct vicinity of the transition of the parallel portions (24, 26) to the converging legs of the U-shaped portions of the sausage suspension loops (14).

4. The arrangement of sausage suspension loops as claimed in claim 2, characterized in that the length (l) of the parallel portions of the first partial loop (22) is about a quarter of the total length (L) of the sausage suspension loops (14), the maximum width (b) of the sausage suspension loops (14) is about a third of their total length (L), and the distance (a) between the parallel portions (24, 26) is about an eighth of the total length (L).

5. The arrangement of sausage suspension loops as claimed in claim 1, characterized in that the plastic strand everywhere has substantially the same cross-section, and its surface is designed as an imitation cord.

* * * * *

UNITED STATES PATENT AND TRADEMARK OFFICE
CERTIFICATE OF CORRECTION

PATENT NO. : 5, 772, 499
DATED : June 30, 1998
INVENTOR(S) : Frank Niedecker

It is certified that error appears in the above-identified patent and that said Letters Patent is hereby corrected as shown below:

Column 4, Claim 5, Line 2      After " claim " delete " 1 " and substitute --- 2 ---

Signed and Sealed this

Eighth Day of June, 1999

Attest:

Q. TODD DICKINSON

*Attesting Officer*     Acting Commissioner of Patents and Trademarks